(No Model.)

E. W. CROUCH.
BUTTER WORKER.

No. 354,504. Patented Dec. 14, 1886.

WITNESSES,

James D. O'Hein

M. C. Henry

INVENTOR,

Enoch W. Crouch

By Walter B. Vincent Atty.

UNITED STATES PATENT OFFICE.

ENOCH W. CROUCH, OF HOPKINTON, RHODE ISLAND.

BUTTER-WORKER.

SPECIFICATION forming part of Letters Patent No. 354,504, dated December 14, 1886.

Application filed November 25, 1885. Serial No. 183,917. (No model.)

*To all whom it may concern:*

Be it known that I, ENOCH W. CROUCH, of Hopkinton, in the county of Washington and State of Rhode Island, have invented a new and useful Butter-Worker; and I do hereby declare that the following specification, taken in connection with the drawings making a part of the same, is a full, clear, and exact description thereof.

Figure 1:
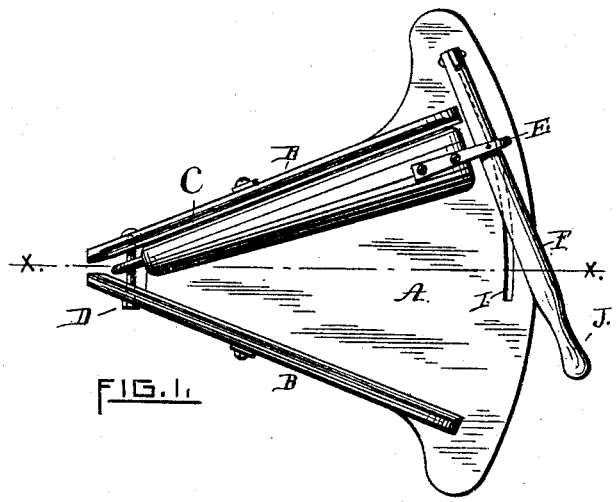
Figure 2:
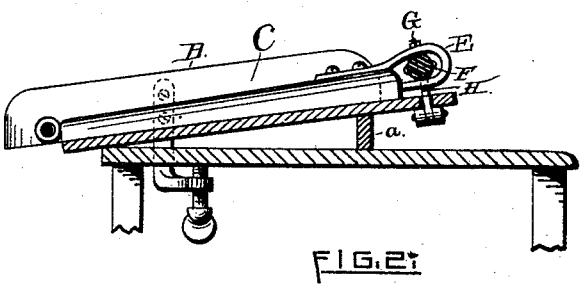
Figure 3:
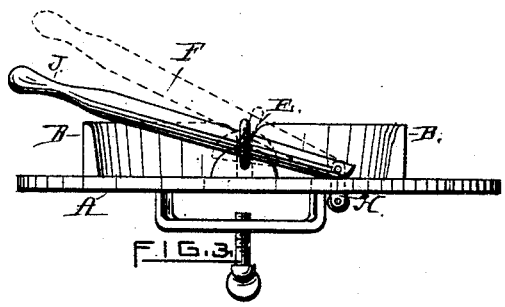

Figure 1 is a top view of my device. Fig. 2 is a section of same, with supporting-table, on line $x$ $x$. Fig. 3 is a rear end view of the device.

The object of my invention is to produce a butter-worker which shall be superior in effectiveness and facility of operation to those now in use; and it consists in the arrangement and mode of operating the pressing-bar, as hereinafter described.

In the drawings, A is the bed of the device, upon which the butter is placed, and is slightly raised at one end by a bar, $a$, and attached to the table in any desired way. The butter is confined laterally to the limits of the bed by side pieces, B B. The side pieces, B B, converge at their front ends, in order to so confine the butter that it may all sooner or later receive the action of the pressing-bar C, one end of which is attached to a stud, D, the other describing in its operation a segment of a circle. The bar C is attached to the stud D by a metallic loop or eye, or in such other manner as will leave it a proper freedom of movement. To the rear end of the bar C is a loop or strap, E, through which passes a lever, F, pivoted thereto in such a manner as to prevent any longitudinal movement of such lever, but leaving it free to move laterally upon its pivot of fulcrum G. To the short arm of the lever F is pivoted a rod, H, which passes through a curved slot, I, in the bed A, and is held upon the under side by a roller or other anti-friction device, which prevents the withdrawal of the rod from the slot, but does not interfere with its horizontal movement through the same.

In operating my device, the butter having been placed on the bed A, the bar C is alternately raised and forced down upon the same by the elevation and depression of the lever F, as indicated by dotted lines, Fig. 3, the handle or long arm J of which is held in the right hand. The slot I and the rod H, moving horizontally therein, enable the operator, as will be readily seen, to change the position of the bar so as to bring any portion of the butter upon the bed under it, and at the same time retain the leverage. The power obtained by the use of the lever F enables the operator to work the butter much more thoroughly, effectively, and rapidly than the same can now be done, and with much less outlay of strength.

I am aware that a butter-worker has been known with a sector-shaped tray and a revoluble fluted roller, with a clamp or stirrup holding it down, with liberty to be moved backward and forward over the curved end of the tray; and I do not claim such.

What I claim as my invention, and desire to secure by Letters Patent, is—

In a butter-worker, the combination, with the bed A, of the tray having a slot, I, a movable part, H, working in said slot, and a pressing-bar, C, hinged or pivoted loosely at one end to a fixed part of the tray, and at the other to a lever, F, which is pivoted at one end to part H, as set forth.

ENOCH W. CROUCH.

Witnesses:
WALTER B. VINCENT,
JAMES D. O'HERN.